(12) United States Patent
Fujieda et al.

(10) Patent No.: US 8,280,151 B2
(45) Date of Patent: Oct. 2, 2012

(54) METHOD FOR DISPLAYING RECOGNITION RESULT OBTAINED BY THREE-DIMENSIONAL VISUAL SENSOR AND THREE-DIMENSIONAL VISUAL SENSOR

(75) Inventors: Shiro Fujieda, Kyoto (JP); Atsushi Taneno, Kyoto (JP); Hiroshi Yano, Toyonaka (JP); Yasuyuki Ikeda, Ikeda (JP)

(73) Assignee: Omron Corporation, Kyoto (JP)

( * ) Notice: Subject to any disclaimer, the term of this patent is extended or adjusted under 35 U.S.C. 154(b) by 377 days.

(21) Appl. No.: 12/711,196

(22) Filed: Feb. 23, 2010

(65) Prior Publication Data
US 2010/0232683 A1  Sep. 16, 2010

(30) Foreign Application Priority Data

Mar. 11, 2009 (JP) ............................. P2009-057430

(51) Int. Cl.
*G06K 9/00* (2006.01)
(52) U.S. Cl. ................................................ 382/154
(58) Field of Classification Search .......... 382/103–105, 382/113, 154, 170, 181, 277, 283, 284, 285, 382/294–297; 345/653, 664, 679
See application file for complete search history.

(56) References Cited

U.S. PATENT DOCUMENTS

| | | | |
|---|---|---|---|
| 5,864,632 A | 1/1999 | Ogawa et al. | |
| 6,278,798 B1 | 8/2001 | Rao | |
| 6,330,356 B1 | 12/2001 | Sundareswaran et al. | |
| 6,445,815 B1 | 9/2002 | Sato | |
| 7,003,136 B1 | 2/2006 | Harville | |
| 7,277,599 B2 * | 10/2007 | Eian et al. | 382/285 |
| 7,526,121 B2 * | 4/2009 | Ban et al. | 382/154 |
| 8,126,260 B2 | 2/2012 | Wallack et al. | |
| 8,170,295 B2 * | 5/2012 | Fujii et al. | 382/117 |

(Continued)

FOREIGN PATENT DOCUMENTS
JP  10-269362 A  10/1998
(Continued)

OTHER PUBLICATIONS

USPTO Non-final Action on U.S. Appl. No. 12/711,018 dated Jun. 4, 2012; 14 pages.

(Continued)

*Primary Examiner* — Brian Le
(74) *Attorney, Agent, or Firm* — Foley & Lardner LLP

(57) ABSTRACT

Display suitable to an actual three-dimensional model or a recognition-target object is performed when stereoscopic display of a three-dimensional model is performed while correlated to an image used in three-dimensional recognition processing. After a position and a rotation angle of a workpiece are recognized through recognition processing using the three-dimensional model, coordinate transformation of the three-dimensional model is performed based on the recognition result, and a post-coordinate-transformation Z-coordinate is corrected according to an angle (elevation angle f) formed between a direction of a line of sight and an imaging surface. Then perspective transformation of the post-correction three-dimensional model into a coordinate system of a camera of a processing object is performed, and a height according to a pre-correction Z-coordinate at a corresponding point of the pre-coordinate-transformation three-dimensional model is set to each point of a produced projection image. Projection processing is performed from a specified direction of a line of sight to a point group that is three-dimensionally distributed by the processing, thereby producing a stereoscopic image of the three-dimensional model.

3 Claims, 8 Drawing Sheets

U.S. PATENT DOCUMENTS

| | | | |
|---|---|---|---|
| 2002/0187831 | A1 | 12/2002 | Arikawa et al. |
| 2004/0051783 | A1 | 3/2004 | Chellappa et al. |
| 2004/0153671 | A1 | 8/2004 | Schuyler et al. |
| 2004/0247174 | A1 | 12/2004 | Lyons et al. |
| 2005/0084149 | A1* | 4/2005 | Aizawa et al. ............... 382/154 |
| 2005/0111703 | A1 | 5/2005 | Merbach et al. |
| 2005/0249400 | A1* | 11/2005 | Fukumoto .................. 382/154 |
| 2005/0249434 | A1 | 11/2005 | Xu et al. |
| 2005/0286767 | A1 | 12/2005 | Hager et al. |
| 2006/0050087 | A1 | 3/2006 | Tanimura et al. |
| 2006/0232583 | A1 | 10/2006 | Petrov et al. |
| 2008/0212887 | A1 | 9/2008 | Gori et al. |
| 2008/0303814 | A1 | 12/2008 | Ishiyama |
| 2010/0231690 | A1 | 9/2010 | Fujieda et al. |
| 2010/0231711 | A1 | 9/2010 | Taneno et al. |
| 2010/0232647 | A1 | 9/2010 | Fujieda et al. |
| 2010/0232681 | A1 | 9/2010 | Fujieda et al. |
| 2010/0232682 | A1 | 9/2010 | Fujieda et al. |
| 2010/0232684 | A1 | 9/2010 | Fujieda et al. |
| 2011/0150280 | A1 | 6/2011 | Tsuji |
| 2012/0050525 | A1 | 3/2012 | Rinner et al. |

FOREIGN PATENT DOCUMENTS

| | | |
|---|---|---|
| JP | 2961264 | 8/1999 |
| JP | 2000-094374 A | 4/2000 |
| JP | 2006-250889 A | 9/2006 |

OTHER PUBLICATIONS

USPTO Notice of Allowance on U.S. Appl. No. 12/711,179 dated Mar. 15, 2012; 6 pages.

USPTO Non-final Action on U.S. Appl. No. 12/711,028 dated Mar. 16, 2012; 12 pages.

Kawai, Y. et al., "Stereo Correspondence Using Segment Connectivity", Journal of Information Processing, vol. 40, No. 8, Aug. 1999, pp. 3219-3229.

USPTO Notice of Allowance on U.S. Appl. No. 12/711,179 dated Jan. 27, 2012; 12 pages.

USPTO Office Action on U.S. Appl. No. 12/710,266 dated Feb. 23, 2012; 11 pages.

Zhengyou Zhang, A Flexible New Technique for Camera Calibration, Technical Report MSR-TR-98-71; Dec. 2, 1998, Microsoft Research, Microsoft Corporation, Redmond, WA 98052; pp. 1-21.

USPTO Final Office Action on U.S. Appl. No. 12/270,266 dated Jul. 16, 2012; 16 pages.

USPTO Non-final Office Action on U.S. Appl. No. 12/711,976 dated Jun. 26, 2012; 12 pages.

USPTO Notice of Allowance on U.S. Appl. No. 12/711,028 dated Jun. 22, 2012; 11 pages.

* cited by examiner

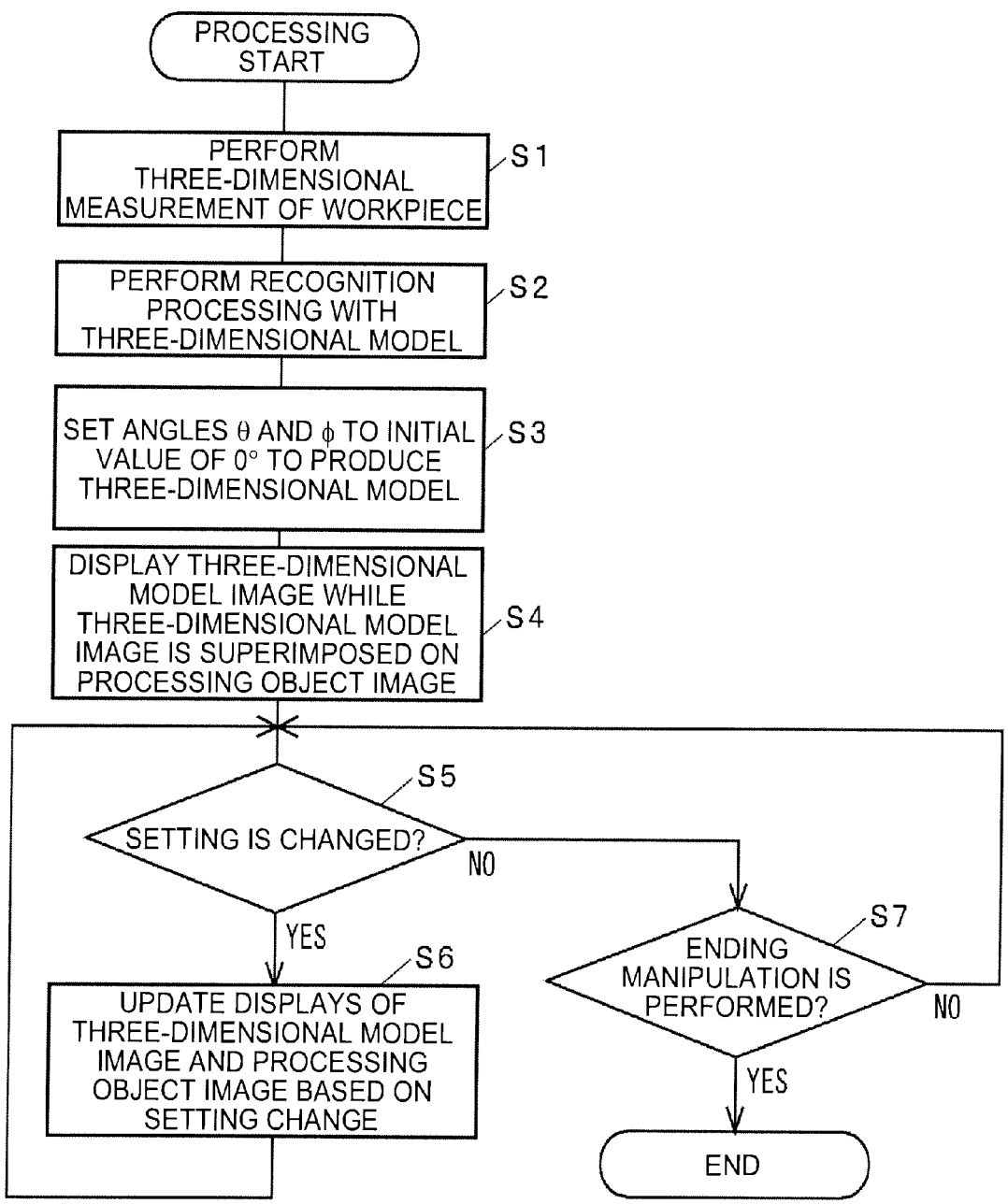

US 8,280,151 B2

METHOD FOR DISPLAYING RECOGNITION RESULT OBTAINED BY THREE-DIMENSIONAL VISUAL SENSOR AND THREE-DIMENSIONAL VISUAL SENSOR

The present invention is based on Japanese Patent Application No. 2009-057430 filed with the Japan Patent Office on Mar. 11, 2009, the entire content of which is hereby incorporated by reference.

BACKGROUND OF THE INVENTION

1. Technical Field

The present invention relates to a three-dimensional visual sensor that recognizes an object through three-dimensional measurement processing using a stereo camera, particularly to a technology for displaying recognition result.

2. Related Art

For example, when three-dimensional recognition processing is performed in order to cause a robot to grasp a component in a manufacturing scene, the three-dimensional information restored by the three-dimensional measurement of a stereo camera is checked with the previously registered three-dimensional model of the recognition-target object to recognize the position and attitude (specifically, a rotation angle with respect to three-dimensional model) of the recognition-target object (for example, see Japanese Unexamined Patent Publication No. 2000-94374). Occasionally the similar technique is applied to inspection to determine whether a position or an attitude of an inspection object is proper.

Generally the three-dimensional model used in the recognition processing expresses a shape (mainly contour) of the full-scale recognition-target object by plural three-dimensional coordinates. In the recognition processing, the three-dimensional model and restored three-dimensional information are correlated to each other such that a degree of coincidence between the three-dimensional model and restored three-dimensional information becomes the maximum.

At this point, the position and rotation angle of the three-dimensional model are specified as the position and attitude of the recognition-target object.

The recognition processing result can be displayed as a coordinate expressing the position and an angle expressing the attitude. However, because only a simple numerical display is difficult to understand, there is a user demand to be able to easily confirm the recognition result and accuracy of the recognition result.

The inventor studies to perform coordinate transformation of the three-dimensional model based on the recognized position or rotation angle to three-dimensionally display the post-coordinate-transformation model. When perspective transformation of the three-dimensional model to which the coordinate transformation into an imaging surface of the camera is performed based on the recognition result, a projection image that is seen in a way similar to that of the recognition-target object is produced. Therefore, the inventor studies a method for changing the projection image of the three-dimensional model to a stereoscopic display according to a change in a direction of a line of sight based on the display in which the projection image of the three-dimensional model is superimposed on the image of the recognition-target object.

However, in the perspective transformation processing, because the projection image is produced based on a parameter reflecting magnification of the camera so as to be seen in the way similar to that of the actual image, even in the plane having the same area, a size of the plane formed on the imaging surface depends on a distance from the camera. Therefore, when the perspective transformation of the image in which a height according to a Z-coordinate at a corresponding point of the original model is correlated to each point of the projection image of the three-dimensional model is performed from a direction distant from a direction orthogonal to the imaging surface, the projection image whose size varies depending on a difference of the Z-coordinate is directly projected to produce the image having a large deformation, and therefore the shape of the three-dimensional model cannot properly be expressed.

SUMMARY

The present invention has been devised to solve the problems described above, and an object thereof is to perform the display suitable to the actual three-dimensional model or the recognition-target object when the stereoscopic display of the three-dimensional model is performed while correlated to the image used in the three-dimensional recognition processing.

In accordance with one aspect of the invention, a method is performed in order to display recognition result of a three-dimensional visual sensor, and the three-dimensional visual sensor includes: an imaging unit that includes at least one camera; a registration unit in which three-dimensional information expressing a full-scale recognition-target object is registered as a three-dimensional model; and a recognition unit that performs three-dimensional measurement to a recognition-target object whose three-dimensional model is registered in the registration unit using an image produced by imaging of the imaging unit and checks three-dimensional information restored by the measurement with the registered three-dimensional model to recognize a position and an attitude of the recognition-target object, on condition that a world coordinate system is defined such that a distance from a reference plane traversing a direction of an optical axis of the camera in the imaging unit becomes a Z-coordinate indicating a height. In the method according to the present the invention, at least one of the cameras is set to a processing object, and a first step, a second step, a third step, and a fourth step are performed every camera of the processing object.

In the first step, a manipulation of specification of a direction of a line of sight with respect to an imaging surface of the camera is received. In the second step, plural Z-coordinates included in a three-dimensional model is corrected to perform perspective transformation of a post-correction three-dimensional model into a coordinate system of the imaging surface of the camera of the processing object for the three-dimensional model to which coordinate transformation is performed in a world coordinate system such that the position and attitude of the three-dimensional model become identical to those of the recognition-target object recognized by the recognition unit. Hereinafter the perspective transformation is referred to as "first perspective transformation". The relationship between the coordinate system of the camera and the world coordinate system is expressed by an equation (1). Each element of a perspective transformation matrix in the equation (1) is determined by previous calibration, which allows the relationship with each coordinate system to be specified.

In the third step, perspective transformation of a point having a three-dimensional coordinate value obtained by setting a height according to a corresponding pre-correction Z-coordinate into a point having a three-dimensional coordinate value obtained by setting a point included in an projection image of the three-dimensional model produced in the coordinate system of the imaging surface of the camera of the processing object by the perspective transformation processing is performed from the direction of the line of sight received in the first step. Hereinafter the perspective transformation is referred to as "second perspective transformation".

In the fourth step, the projection image produced by the perspective transformation in the third step is displayed on a monitor device.

In the above method, a rule of correction operation is applied to the Z-coordinate correction in the second step. In the rule of correction operation, a correction amount to each Z-coordinate is set to zero when an orthogonal relationship is established between the direction of the line of sight received in the first step and the imaging surface of the camera of the processing object, each Z-coordinate is corrected to a constant value Z0 when the direction of the line of sight becomes parallel to the imaging surface, each post-correction Z-coordinate is brought close to the constant value Z0 as the relationship between the direction of the line of sight and the imaging surface becomes close to a parallel state from the orthogonal state, and a difference between post-correction Z-coordinates Z1' and Z2' of any two of Z-coordinates Z1 and Z2 (Z1>Z2) is gradually decreased while a relationship of Z1'>Z2' is maintained.

In the above method, after the Z-coordinate of the three-dimensional model to which the coordinate transformation is already performed so as to be matched with the recognized position and attitude is corrected based on the relationship between the direction of the line of sight specified by the user and the imaging surface of the camera of the processing object, the perspective transformation of the post-correction three-dimensional model into the coordinate system of the camera of the processing object is performed (first perspective transformation). Further, the height according to the pre-correction Z-coordinate at the corresponding point of the post-coordinate-transformation three-dimensional model is set to each point of the projection image that is produced in the camera coordinate system through the first perspective transformation, whereby the points are disposed in the position corresponding to the height at the corresponding point of the three-dimensional model to perform second perspective transformation to the three-dimensionally-distributed points.

Assuming that x, y, z are axes of the coordinate system of the camera (xy-plane corresponding to the imaging surface), when the direction orthogonal to the imaging surface, that is, the direction in which the imaging surface is squarely seen is specified as the direction of the line of sight, because a correction amount of the three-dimensional model to the Z-coordinate becomes zero, the post-coordinate-transformation three-dimensional model is directly projected to the xy-plane (imaging surface) of the camera coordinate system in the first perspective transformation. Therefore, it is considered that the projection image produced in the xy-plane is similar to the image produced when the three-dimensional model is imaged with the camera of the processing object. Even if the height according to the Z-coordinate at the corresponding point of the three-dimensional model is set to each point to perform the perspective transformation from the direction orthogonal to the imaging surface, the projection image is seen in the way similar to that of the projection image produced through the first perspective transformation. Accordingly, the image similar to that of the case in which the image that the post-coordinate-transformation three-dimensional model is projected to the imaging surface of the camera of the processing object can be expressed even if the Z-coordinate is not corrected.

On the other hand, when the direction parallel to the imaging surface is specified as the direction of the line of sight, that is, when the direction orthogonal to the z-axis direction of the camera coordinate system is specified as the direction of the line of sight, all the Z-coordinates are corrected to the constant value Z0. In the first perspective transformation, the point in which the X- and Y-coordinates are identical is projected to the same coordinates in the xy-plane of the camera coordinate system irrespective of the pre-correction Z-coordinate. Accordingly, when the height according to the pre-correction Z-coordinate at the corresponding point of the post-coordinate-transformation three-dimensional model is set to each point of the projection image of the three-dimensional model, each projection point in which the X- and Y-coordinates are identical can be disposed at the height according to the original Z-coordinate while the x- and y-coordinates are maintained in the same state. Therefore, the image expressing the state in which the three-dimensional model is observed right beside can be produced by performing the perspective transformation of the points from the immediately lateral direction.

When the direction oblique to the imaging surface is specified as the direction of the line of sight, each Z-coordinate is corrected such that each of the post-correction X-, Y-, and Z-coordinates come close to the constant value Z0 as the direction of the line of sight is brought close to the state parallel to the imaging surface, and such that a difference between the post-correction Z-coordinates is decreased. Accordingly, even if the direction of the line of sight is largely deviated from the direction orthogonal to the imaging surface, each point of the projection image can be disposed at the height according to the original Z-coordinate to perform the second perspective transformation while the influence of the Z-coordinate on the projection image produced by the first perspective transformation is decreased, so that the deformation of the projection image in the second projection transformation can be prevented from being generated. Therefore, the image in which the three-dimensional model observed from the specified direction is expressed without a feeling of strangeness can be produced.

Accordingly, a user can visually confirm the recognition result with the three-dimensional model by confirming the state of the three-dimensional model in the projection image that is displayed while the direction of the line of sight is changed in various ways.

In the method of the above aspect, preferably a step of specifying a size per one pixel is previously performed to the camera of the processing object based on a relationship between the coordinate system of the camera and the world coordinate system, the size per one pixel being allocated to the imaging surface in performing perspective transformation of a plane in which a height in a space is zero into the imaging surface of the camera of the processing object. In the third step, for each point of the projection image of the three-dimensional model, the pre-correction Z-coordinate at a corresponding point of the pre-coordinate-transformation three-dimensional model is converted into the number of pixels based on the size per one pixel specified in the step, and the number of pixels is set to the height after the conversion.

Accordingly, because a scale factor substantially identical to that of the x- and y-coordinates is set to the z-coordinate of each projection point of the three-dimensional model, the size in the height direction of the projection image of the three-dimensional model can properly be set, and the image can be produced and displayed without a feeling of strangeness.

In accordance with another aspect of the invention, a three-dimensional visual sensor includes an imaging unit that includes at least one camera; a registration unit in which three-dimensional information expressing a full-scale recognition-target object is registered as a three-dimensional model; and a recognition unit that performs three-dimensional measurement to a recognition-target object whose three-dimensional model is registered in the registration unit using an image produced by imaging of the imaging unit and checks three-dimensional information restored by the measurement with the registered three-dimensional model to recognize a position and an attitude of the recognition-target object, on condition that a world coordinate system is defined such that a distance from a reference plane traversing a direction of an optical axis of the camera in the imaging unit becomes a Z-coordinate indicating a height.

The three-dimensional visual sensor according to the present invention also includes a specifying manipulation receiving unit that sets at least one of the cameras to a processing object to receive a manipulation of specification of a direction of a line of sight with respect to an imaging surface of the camera of the processing object; a first perspective transformation unit that corrects plural Z-coordinates included in a three-dimensional model to perform perspective transformation of a post-correction three-dimensional model into a coordinate system of the imaging surface of the camera of the processing object based on a relationship between the direction of the line of sight received by the specifying manipulation receiving unit and the imaging surface of the camera of the processing object, the three-dimensional model to which coordinate transformation is performed in a world coordinate system such that the position and attitude of the three-dimensional model become identical to those of the recognition-target object recognized by the recognition unit; a second perspective transformation unit that performs perspective transformation of a point having a three-dimensional coordinate value obtained by setting a height according to a corresponding pre-correction Z-coordinate into a point having a three-dimensional coordinate value obtained by setting a point included in an projection image of the three-dimensional model produced in the coordinate system of the imaging surface of the camera of the processing object by the perspective transformation processing performed through the first perspective transformation unit from the direction of the line of sight received in the specifying manipulation receiving unit; and a display control unit that displays the projection image produced through the perspective transformation performed by the second perspective transformation unit on a monitor device. In the three-dimensional visual sensor according to the present invention, a rule of correction operation is applied to the Z-coordinate correction in the first perspective transformation unit. In the rule of correction operation, a correction amount to each Z-coordinate is set to zero when an orthogonal relationship is established between the direction of the line of sight received in the first step and the imaging surface of the camera of the processing object, each Z-coordinate is corrected to a constant value Z0 when the direction of the line of sight becomes parallel to the imaging surface, each post-correction Z-coordinate is brought close to the constant value Z0 as the relationship between the direction of the line of sight and the imaging surface becomes close to a parallel state from the orthogonal state, and a difference between post-correction Z-coordinates Z1' and Z2' of any two of Z-coordinates Z1 and Z2 (Z1>Z2) is gradually decreased while a relationship of Z1'>Z2' is maintained.

In the recognition result displaying method and the three-dimensional visual sensor to which the recognition result displaying method is adopted, the user can easily confirm the recognition result by the checking with the three-dimensional model through the three-dimensional display of the three-dimensional model, and the user-friendliness of the three-dimensional visual sensor is considerably enhanced.

BRIEF DESCRIPTION OF THE DRAWINGS

FIG. 8 is a flowchart illustrating a procedure of processing performed to one workpiece.

DETAILED DESCRIPTION

Figure 1:
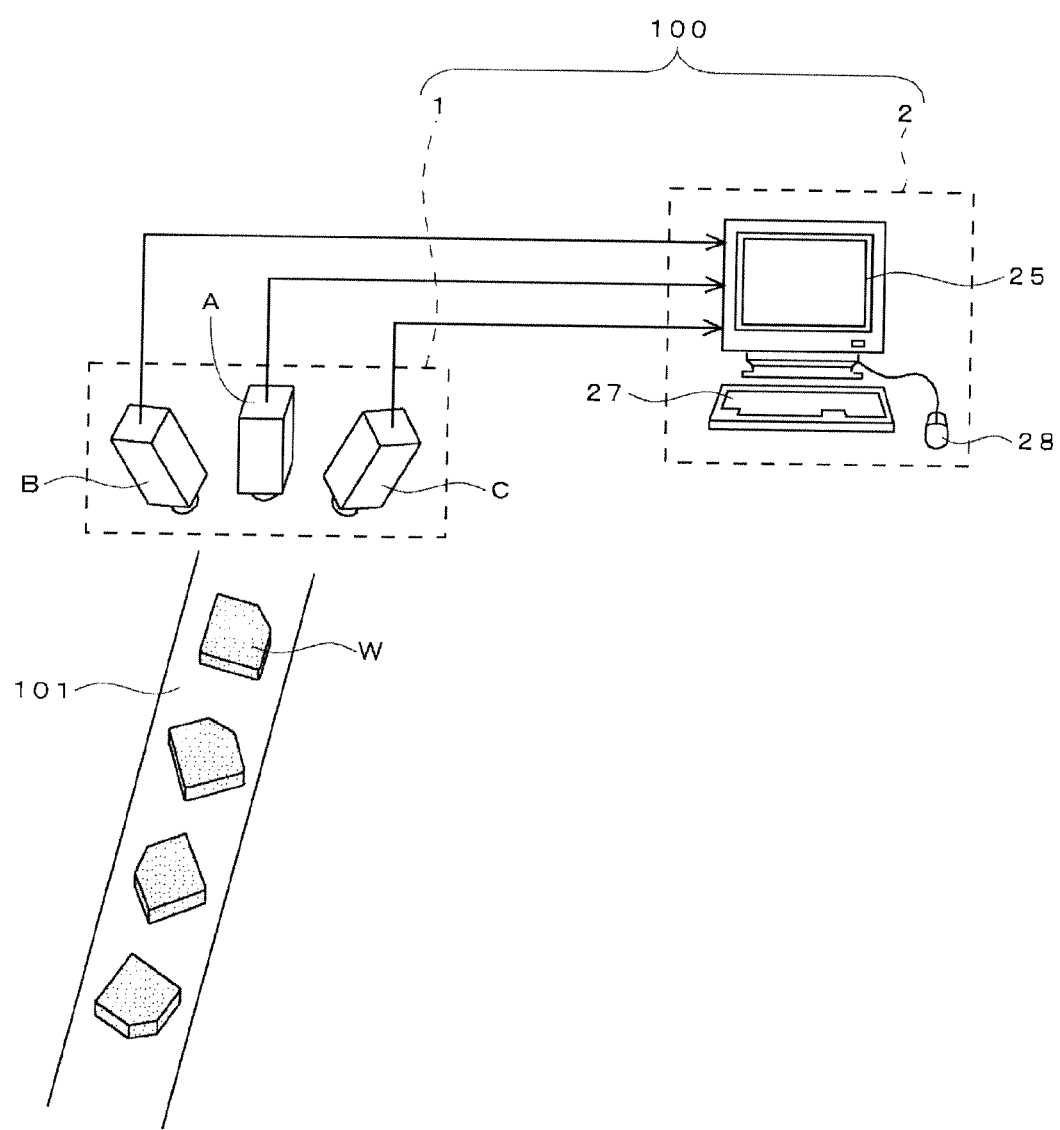
FIG. 1 illustrates a configuration of a production line to which a three-dimensional visual sensor according to an embodiment of the invention is introduced.

FIG. 1 illustrates an example in which a three-dimensional visual sensor 100 according to an embodiment of the invention is introduced to a production line of a factory.

The three-dimensional visual sensor 100 of the embodiment is used to recognize a position and an attitude of a workpiece W (morphology is simplified for the sake of convenience) conveyed by a conveying line 101 in order to assemble the workpiece W in a predetermined product. Information indicating recognition result is transmitted to a robot controller (not illustrated) of a robot (not illustrated) disposed downstream in the conveying line 101, and the information is used to control an operation of the robot.

The three-dimensional visual sensor 100 includes a stereo camera 1 and a recognition processing device 2 that is disposed near the conveying line 101. The stereo camera 1 includes three cameras A, B, and C that are horizontally disposed above the conveying line 101. The central camera A is disposed while an optical axis of the central camera A is orientated toward a vertical direction (that is, the central camera A squarely sees the workpiece W), and the right and left cameras B and C are disposed while optical axes are inclined.

The recognition processing device 2 is a personal computer in which a dedicated program is stored. The recognition processing device 2 includes a monitor device 25, a keyboard 27, and a mouse 28. In the recognition processing device 2, after images produced by the cameras A, B, and C are captured to perform three-dimensional measurement to a contour of the workpiece W, restored three-dimensional information is checked with a previously-registered three-dimensional model.

Figure 2:
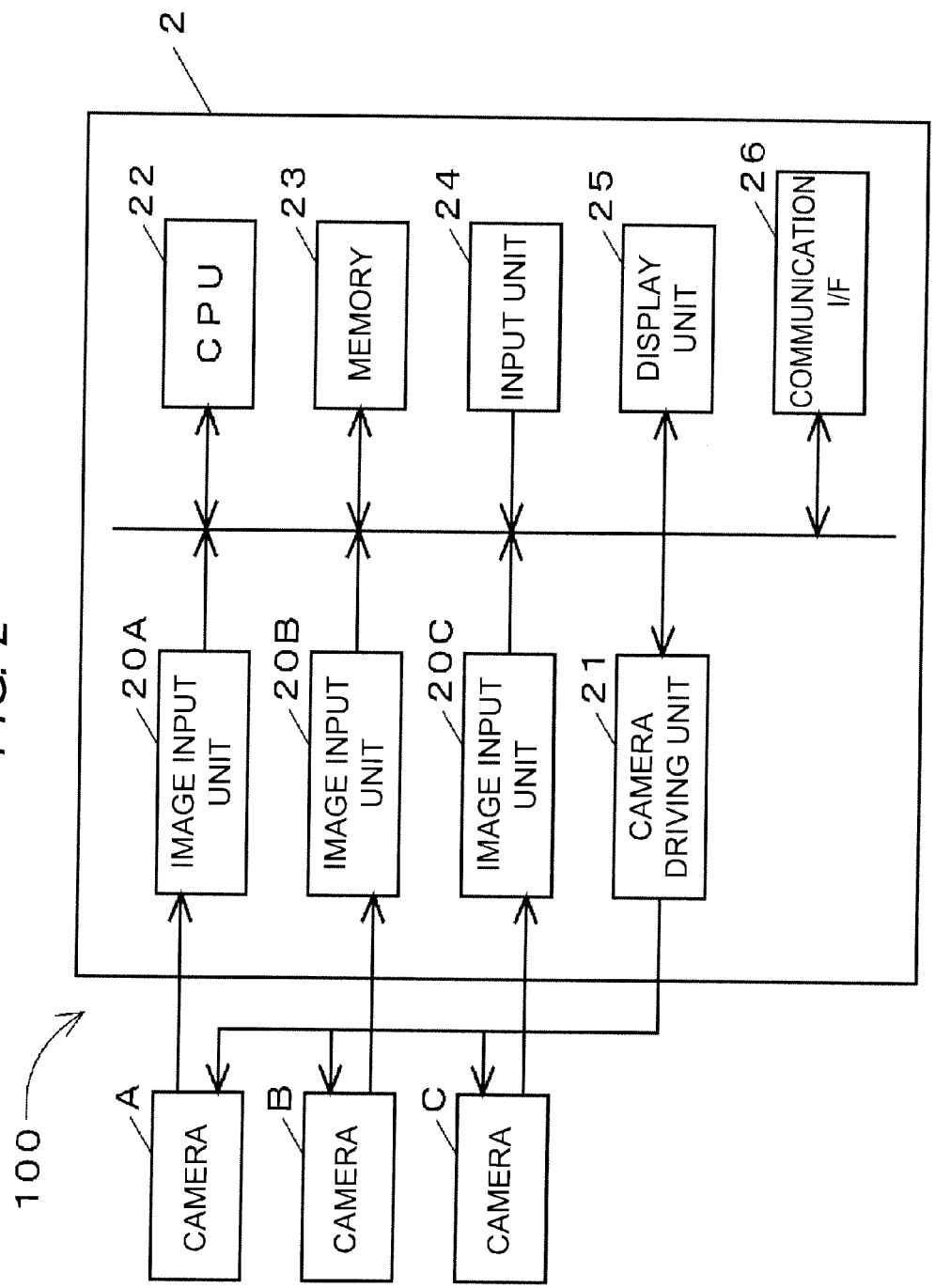
FIG. 2 is a block illustrating an electric configuration of the three-dimensional visual sensor of the embodiment.

FIG. 2 is a block illustrating a configuration of the three-dimensional visual sensor 100.

Referring to FIG. 2, the recognition processing device 2 includes image input units 20A, 20B, and 20C corresponding to the cameras A, B, and C, a camera driving unit 21, a CPU 22, a memory 23, an input unit 24, a display unit 25, and a communication interface 26.

The camera driving unit 21 simultaneously drives the cameras A, B, and C in response to a command provided from the CPU 22. Therefore, the images produced by the cameras A, B, and C are inputted to the CPU 22 through the image input units 20A, 20B, and 20C.

The display unit 25 is a monitor device of FIG. 1. The input unit 24 is a device in which the keyboard 27 and mouse 28 of FIG. 1 are collected. In performing calibration processing, the input unit 24 and the display unit 25 are used to input setting information and to display information for assisting work. The communication interface 26 is used to conduct communication with a robot controller.

The memory 23 includes a large-capacity memory such as ROM, RAM, and a hard disk. Programs for the calibration processing, production of the three-dimensional model, and three-dimensional recognition processing of the workpiece W and setting data are stored in the memory 23. A parameter for the three-dimensional measurement computed through the calibration processing and the three-dimensional model are also registered in a dedicated area of the memory 23.

Based on the program in the memory 23, the CPU 22 performs the calibration processing and processing for registering the three-dimensional model. Therefore, the three-dimensional recognition processing can be performed to the workpiece W.

In the calibration processing, using a calibration plate (not illustrated) in which a predetermined calibration pattern is drawn, a world coordinate system is defined such that a distance from a reference plane (that is, an upper surface of the conveying line 101 of FIG. 1) supporting the workpiece W becomes a Z-coordinate indicating a height. The imaging of the calibration plate and the image processing are performed in plural cycles. Using a plural combinations of three-dimensional coordinates (X, Y, Z) of the world coordinate system and two-dimensional coordinates (x, y) on a imaging surface of the camera, a 3'4 perspective transformation matrix adopted to the following transformation equation (equation (1)) is derived every camera (S in the equation (1 can be computed from an equation (1-2))).

[Formula 1]

$$S \begin{pmatrix} x \\ y \\ 1 \end{pmatrix} = \begin{pmatrix} P_{00} & P_{01} & P_{02} & P_{03} \\ P_{10} & P_{11} & P_{12} & P_{13} \\ P_{20} & P_{21} & P_{22} & P_{23} \end{pmatrix} \begin{pmatrix} X \\ Y \\ Z \\ 1 \end{pmatrix} \qquad (1)$$

In the perspective transformation matrix, elements P00, P01, . . . , and P23 are determined as the parameter for three-dimensional measurement in each of the cameras A, B, and C, and the elements P00, P01, . . . , and P23 are registered in the memory 23. The completion of the registration can perform three-dimensional measurement to the workpiece W.

In the three-dimensional measurement processing of the embodiment, after the edges are extracted from the images produced by the cameras A, B, and C, each edge is divided into units called "segments" based on a connecting point or a branch point, and the segments are correlated among the images. The computation is performed every combination of correlated segments using the parameter, thereby deriving a set of three-dimensional coordinates expressing three-dimensional segment. Hereinafter the processing is referred to as "restoration of three-dimensional information".

Figure 3:
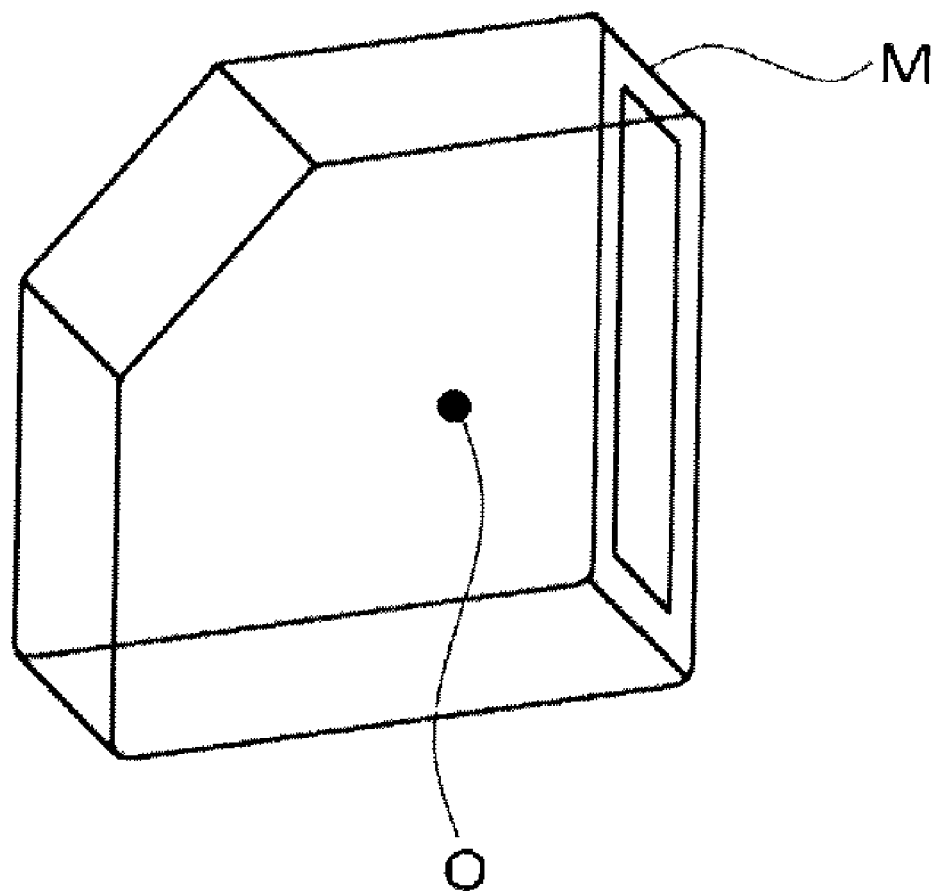
FIG. 3 illustrates a configuration example of a three-dimensional model.

In the embodiment, for the purpose of the three-dimensional information restoration processing, a three-dimensional model M expressing a whole contour shape of the workpiece W is produced as illustrated in FIG. 3. The three-dimensional model M includes a three-dimensional coordinate of one point O (such as a gravity center) that is of a representative point and a basic attitude (orientations of coordinate axes X, Y, and Z) that is a reference of attitude measurement of the recognition-target object in addition to the pieces of three-dimensional information on the plural segments.

In the recognition processing with the three-dimensional model M, a feature point (specifically, a branch point of the segment) in the three-dimensional information restored by the three-dimensional measurement and a feature point on the side of the three-dimensional model M are correlated by a round-robin method to compute a degree of similarity between both the sides. The correspondence between the feature points is specified as a correct relationship when the degree of similarity becomes the maximum. At this point, the coordinate corresponding to the representative point O of the three-dimensional model M is recognized as the position of the workpiece W. When the specified relationship is obtained, the rotation angle of the three-dimensional model M is recognized as the rotation angle of the workpiece W with respect to the basic attitude indicated by the three-dimensional model M. The rotation angle is computed in each of the axes X, Y, and Z.

Figure 4:
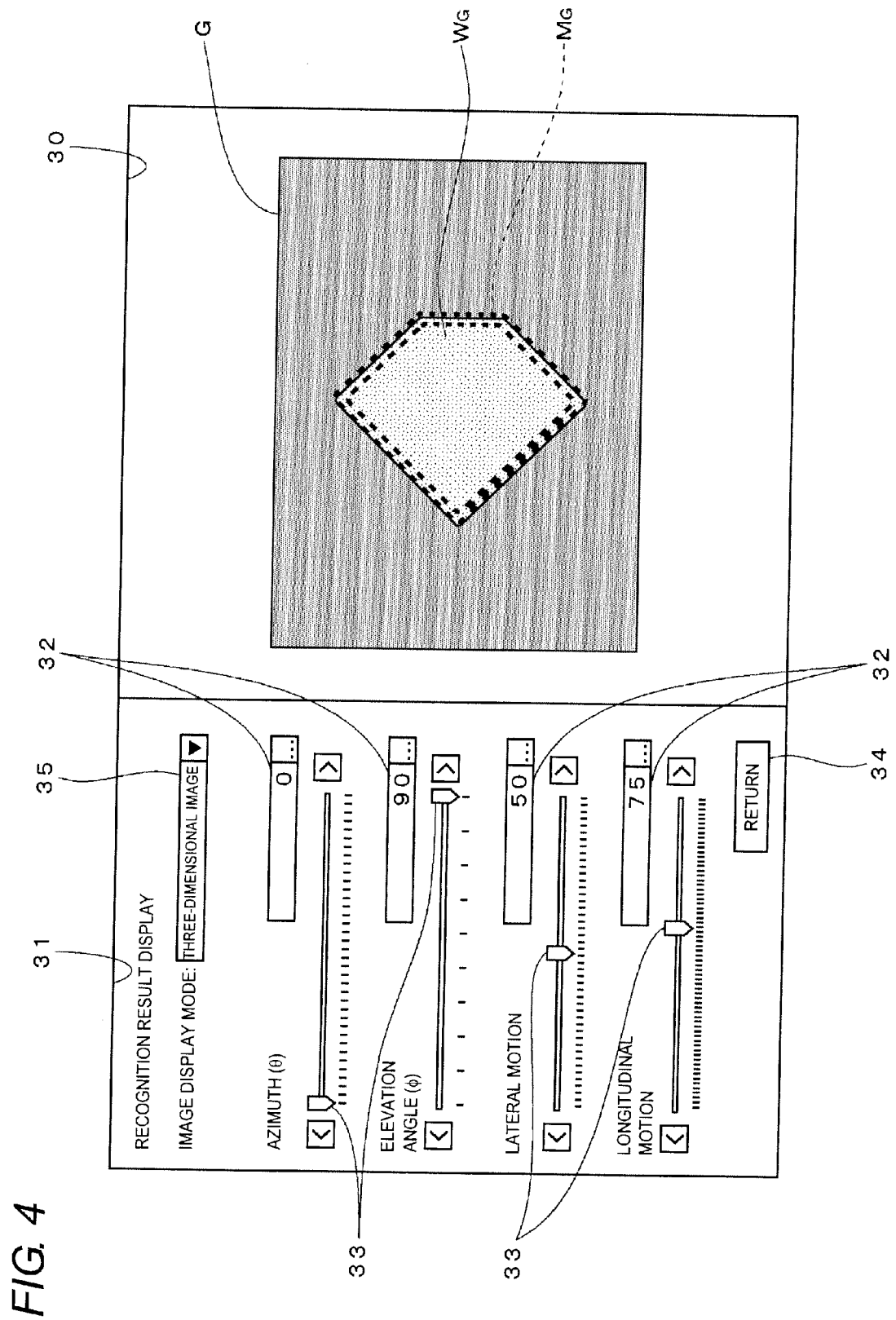
FIG. 4 illustrates a confirmation screen of recognition result performed by the three-dimensional model.

In the embodiment, a screen of FIG. 4 is displayed on the display unit 25 such that a user can appropriately confirm the recognition processing result with the registered three-dimensional model M. The confirmation screen is horizontally divided into two parts, and an image display region 30 is set on the right while a manipulation region 31 is set on the left.

Figure 5:
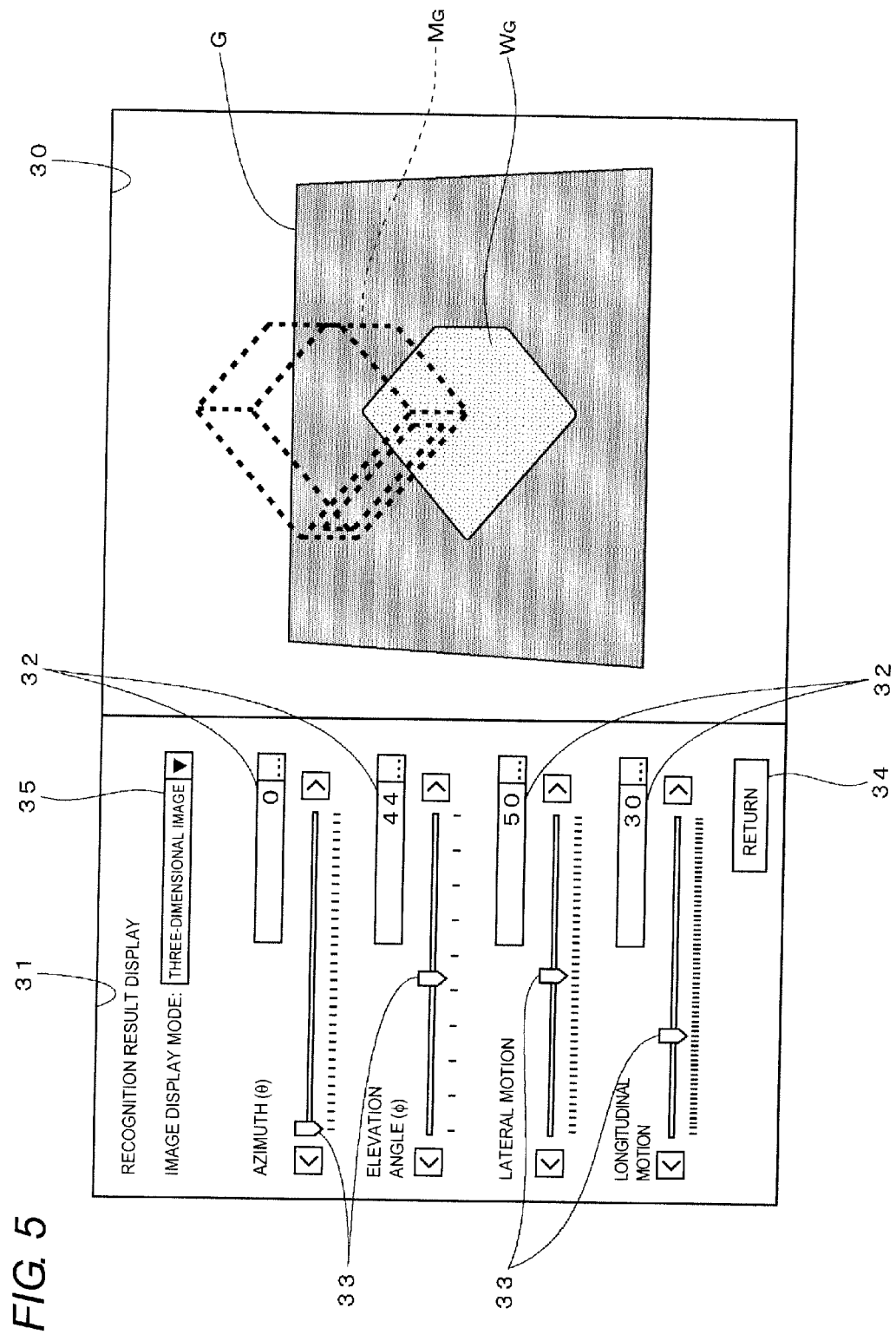
FIG. 5 illustrates an example in which an image on the confirmation screen is updated.
Figure 6:
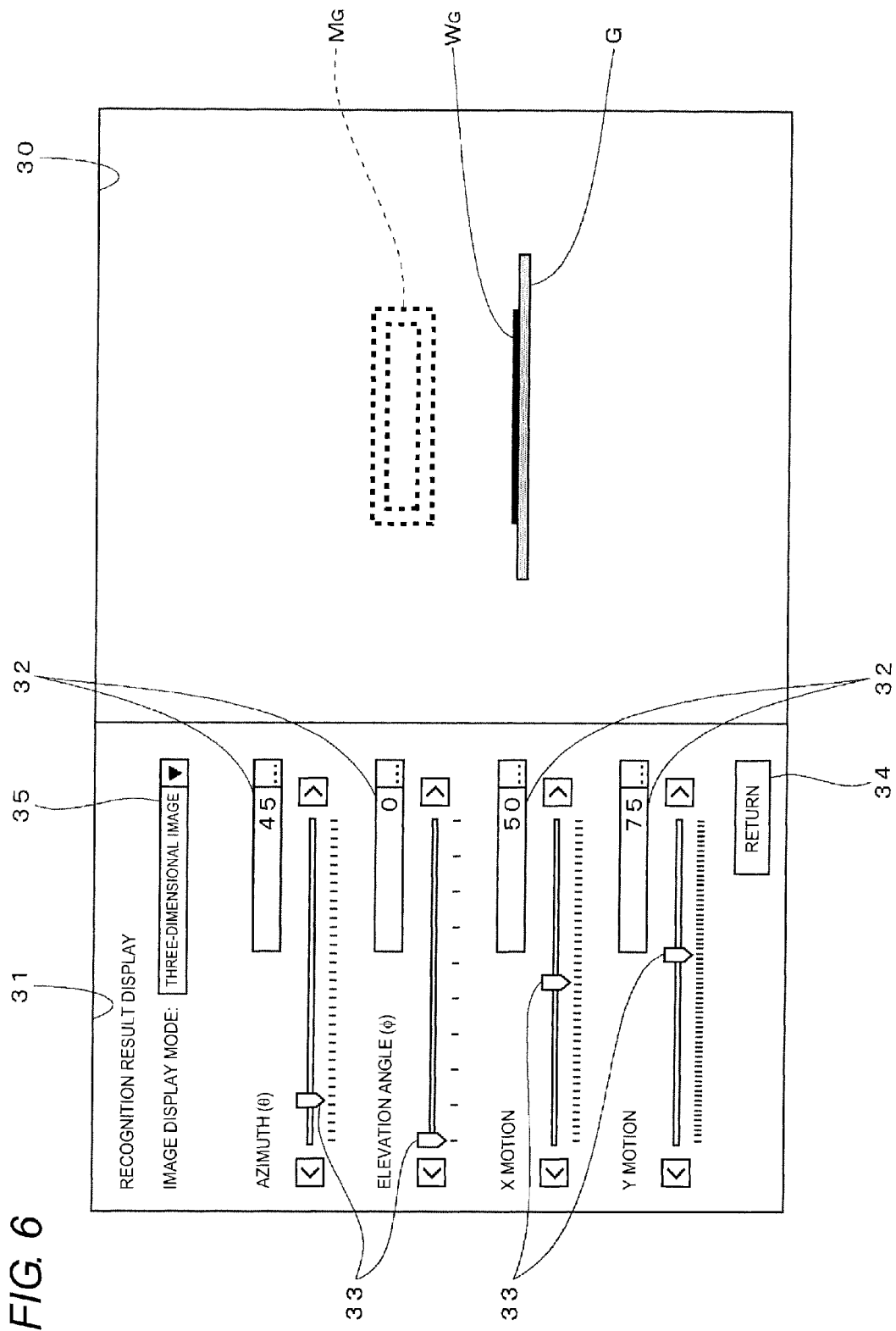
FIG. 6 illustrates an example in which an image on the confirmation screen is updated.

An image G (hereinafter referred to as "processing object image G") that is produced by one of the cameras A, B, and C (at this point, the squarely seeing camera A is selected) and used in the recognition processing is displayed in the image display region 30 along with a background region (a white portion in the image display region 30) having a predetermined extent. In FIGS. 4, 5 and 6, the letter WG designates the workpiece W in the processing object image G.

A graphic MG (indicating the contour shape of the workpiece W) expressed by a uniform color line indicating the three-dimensional model M is also displayed in the image display region 30 while superimposed on the processing object image G. As illustrated in FIGS. 5 and 6, the graphic MG of the three-dimensional model is changed to a stereoscopic display by specification of the change in direction of the line of sight with respect to the image. Hereinafter the stereoscopic graphic MG of the three-dimensional model is referred to as "three-dimensional model graphic MG".

Input boxes 32 and sliders 33 are provided in the manipulation region 31 on the left side for four kinds of numerical information of an azimuth θ, an elevation angle φ, a lateral motion amount, and a longitudinal motion amount. The user inputs each numerical value in the input box 32, and the user changes each numerical value by a motion manipulation of the slider 33.

A selection box 35 is provided in an upper portion of the manipulation region 31 in order to select the display of the image display region 30. The user can call a menu from the selection box 35 to switch the image display region to another display mode (description is omitted).

A button 34 is provided in a lower end portion of the manipulation region 31 in order to return the display in the image display region 30 to the previous state. Although not illustrated, the button 34 is set to an invalid state in the initial state screen of FIG. 4.

The azimuth θ expresses an azimuth direction of the line of sight with respect to a reference plane of the world coordinate system. For the sake of convenience, the azimuth θ is expressed by the rotation angle of the processing object image G with respect to the display screen of the display unit 25.

The elevation angle φ is an angle that is formed by the direction of the line of sight with respect to the reference plane of the world coordinate system. For example, the elevation angle φ becomes 90° when the image is squarely seen, and the elevation angle φ becomes 0° when the image is seen right beside.

From the viewpoint of the perspective transformation processing with an equation (d), the azimuth θ indicates the azimuth direction of the line of sight in the camera coordinate system of the camera A, and the elevation angle φ indicates an angle that is formed by the direction of the line of sight with respect to the xy-plane (corresponding to the imaging surface) of the camera coordinate system.

The lateral motion amount and the longitudinal motion amount are used to set a disposition position of the image in the image display region 30. The lateral motion amount, the longitudinal motion amount, and the angles θ and φ are used as parameters of the perspective transformation processing.

The screen of FIG. 4 is displayed immediately after the recognition processing is ended, the processing object image G produced by the camera A is displayed in the image display region 30 in a usual attitude (the x-axis direction of the image is correlated to the horizontal direction of the screen while the y-axis direction is correlated to the vertical direction of the screen). The three-dimensional model graphic MG that is disposed while superimposed on the processing object image G illustrates the state in which the three-dimensional model in which the position and the attitude are matched with the recognition result is observed from the line of sight of the camera A. Accordingly, when the three-dimensional model graphic MG and the workpiece WG in the processing object image G are accurately aligned to each other like the example of FIG. 4, it is believed that the recognition is accurately performed with the three-dimensional model M.

The display in the image display region 30 is in the state of FIG. 4, the azimuth θ in the manipulation region 31 indicates 0°, and the elevation angle φ indicates 90°. In the embodiment, the user can freely change the angles θ and φ to change the display of the workpiece W of stereoscopic image.

FIG. 5 illustrates an example of the display screen in which the elevation angle φ is set to 44° while the azimuth θ is maintained at 0°. In the screen of FIG. 5, the display is changed to the display in which the processing object image G is observed from obliquely above, and the three-dimensional model graphic MG is also changed to the stereoscopic image expressing the state in which the three-dimensional model M is seen from obliquely above.

FIG. 6 illustrates the display screen in which the elevation angle φ is set to 0° while the azimuth θ is set to 45°. In the screen of FIG. 6, because of the specification that the image is rotated by 45° to be observed right beside, the processing object image G is displayed in the one-dimensional state. The three-dimensional model graphic MG is changed to the graphic in which the three-dimensional model M is rotated by 45° from the states of FIGS. 4 and 5 to express a side face opposite the line of sight.

In the displays of FIGS. 5 and 6, the three-dimensional model graphic MG is displayed slightly above the processing object image. This is the three-dimensional model graphic MG is compared to the processing object image for the sake of convenience. Alternatively, a region corresponding to a bottom surface of the three-dimensional model M may be displayed while correlated to the workpiece W in the processing object image.

The change of the processing object image G or the three-dimensional model graphic MG is generated by the perspective transformation processing that is performed based on contents set in the manipulation region 31. Because the processing object image G is two-dimensional data, the processing object image G is displayed as the plane even after the perspective transformation. On the other hand, for the three-dimensional model graphic MG, the stereoscopic image can be displayed by performing the perspective transformation to the three-dimensional information in the camera coordinate system of the camera A, into which the transformation of the three-dimensional information expressing the full-scale recognition-target object is performed.

Figure 7:
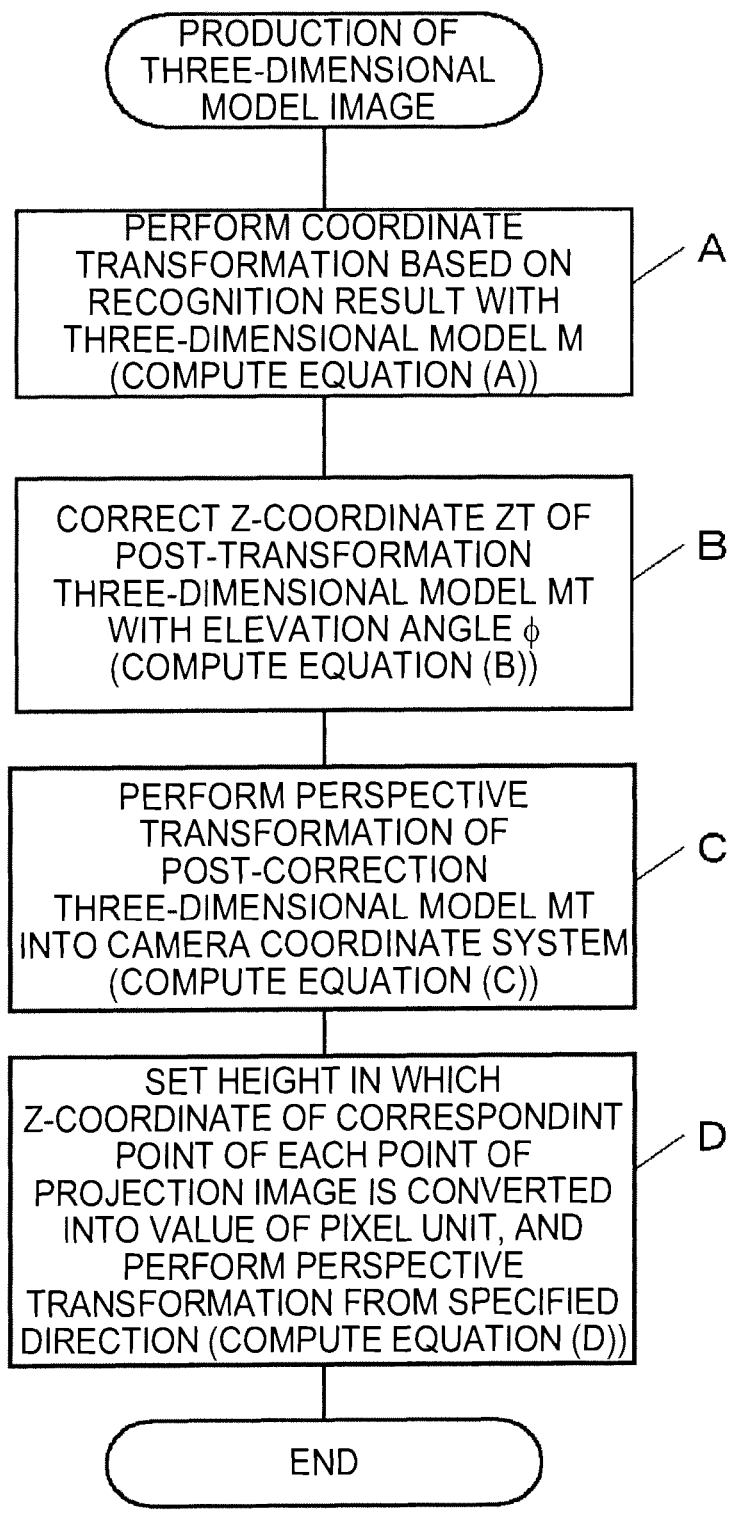
FIG. 7 is a flowchart illustrating a procedure of processing for producing a three-dimensional model image.

FIG. 7 illustrates a procedure of processing for producing the three-dimensional model image. Four steps A, B, C, and D of the flowchart of FIG. 7 will be described in detail.

(Step A)

In the step A, the coordinate transformation of the three-dimensional model registered in the memory 23 is performed based on the position and rotation angle, which are recognized with respect to the workpiece W. Specifically a position deviation amount of the coordinate recognized as a representative point of the workpiece W to the coordinate registered as the representative point O of the three-dimensional model M is determined in each of the axes X, Y, and Z. Elements $T_{00}$, $T_{01}$, $T_{02}$ ..., and $T_{23}$ (see the following equation (a)) of a transformation matrix of homogenous coordinate transformation are determined based on the position deviation amounts and the angle (rotation angle in each of the axes X, Y, and Z) computed as the rotation angle of the workpiece W to the three-dimensional model.

Then a post-transformation coordinate (Xt, Yt, Zt) is determined for each point included in the three-dimensional model M by performing the operation of the equation (a) to which the coordinate (XMP, YMP, ZMP) at each point and the homogeneous transformation matrix are adapted. Hereinafter the three-dimensional model indicated by the post-transformation coordinate (Xt, Yt, Zt) is referred to as "three-dimensional model Mt".

[Formula 2]

$$\begin{bmatrix} X_t \\ Y_t \\ Z_t \\ 1 \end{bmatrix} = \begin{bmatrix} T_{00} & T_{01} & T_{02} & T_{03} \\ T_{10} & T_{11} & T_{12} & T_{13} \\ T_{20} & T_{21} & T_{22} & T_{23} \\ 0 & 0 & 0 & 1 \end{bmatrix} \begin{bmatrix} X_{MP} \\ Y_{MP} \\ Z_{MP} \\ 1 \end{bmatrix} \quad (a)$$

(Step B)

In the step B, the Z-coordinate Zt at each point of the three-dimensional model Mt is corrected using the elevation angle φ. Specifically a post-correction Z-coordinate Zt' is computed by the following equation (b) to which the elevation angle φ and a Z-coordinate Z0 at the representative point of the three-dimensional model Mt are adapted. The Z-coordinate Z0 is obtained by performing the coordinate transformation of the coordinate at the representative point O of FIG. 3 in the step A.

[Formula 3]

$$Zt' = (Zt - Z0)\left(\frac{\phi}{90}\right) + Z0 \quad (b)$$

In the equation (b), when the elevation angle φ is 90°, the post-correction Z-coordinate Zt' is equal to the Z-coordinate Zt, that is, the correction amount becomes zero. When the elevation angle φ is 0°, the post-correction Z-coordinate Zt' is equal to the constant value Z0, that is, all the Z-coordinates are transformed into the constant value Z0 irrespective of the Z-coordinate Zt.

In the numerical range where the elevation angle φ is larger than 90° while being smaller than 0°, the post-correction Z-coordinate Zt' comes close to the constant value Z0 as the elevation angle φ is brought close to 0°. The distance between the post-correction coordinates of the two Z-coordinates having different values is shortened as the elevation angle φ is brought close to 0°.

(Step C)

In the step C, the perspective transformation of the three-dimensional model Mt whose Z-coordinate is already corrected by the equation (b) is performed into the xy-plane of the coordinate system of the camera A. At this point general perspective transformation will be described using the equation (1). The equation (1) can be dissolved into an equation (1-1) and an equation (1-2).

[Formula 4]

$$\begin{pmatrix} x \\ y \end{pmatrix} = \frac{1}{S} \begin{pmatrix} P_{00} & P_{01} & P_{02} & P_{03} \\ P_{10} & P_{11} & P_{12} & P_{13} \end{pmatrix} \begin{pmatrix} X \\ Y \\ Z \\ 1 \end{pmatrix} \quad (1\text{-}1)$$

$$S = P_{20}X + P_{21}Y + P_{22}Z + P_{23} \quad (1\text{-}2)$$

Therefore, a relationship between the pre-transformation three-dimensional coordinate (X, Y, Z) and the post-transformation two-dimensional coordinate (x, y) can be expressed by an equation (2) by replacing S in the equation (1-1) by the right side of the equation (1-2).

[Formula 5]

$$\begin{pmatrix} x \\ y \end{pmatrix} = \frac{1}{P_{20}X + P_{21}Y + P_{22}Z + P_{23}} \begin{pmatrix} P_{00} & P_{01} & P_{02} & P_{03} \\ P_{10} & P_{11} & P_{12} & P_{13} \end{pmatrix} \begin{pmatrix} X \\ Y \\ Z \\ 1 \end{pmatrix} \quad (2)$$

However, because the general transformation equation expresses the state in which the stereoscopic shape indicated by the three-dimensional information is imaged with the camera, even if the planes have the same shape and the same area, the planes have the different sizes of the projection images when the planes differ from each other in the Z-coordinate (the camera projection image becomes small as the plane is distant from the camera, that is, as the Z-coordinate is decreased). When the perspective transformation of the projection images having the different sizes is performed from the direction away from the direction orthogonal to the imaging surface, the difference in size is directly projected, which results in the projection image in which the shape envisaged from the direction of the line of sight is not correctly expressed.

Therefore, in the embodiment, a projection image variation amount is adjusted according to the difference of the Z-coordinate by computing the following equation (c) in which the post-correction Z-coordinate Zt' is incorporated.

[Formula 6]

$$\begin{pmatrix} x \\ y \end{pmatrix} = \frac{1}{P_{20}Xt + P_{21}Yt + P_{22}Zt' + P_{23}} \begin{pmatrix} P_{00} & P_{01} & P_{02} & P_{03} \\ P_{10} & P_{11} & P_{12} & P_{13} \end{pmatrix} \begin{pmatrix} Xt \\ Yt \\ Zt' \\ 1 \end{pmatrix} \quad (c)$$

As described above, as the elevation angle φ is brought close to 0°, the post-correction Z-coordinate Zt' comes close to the constant value Z0, and the difference among post-correction Z-coordinate is decreased. Therefore, the projection position at each point of the three-dimensional model Mt by the equation (c) in which the post-correction Z-coordinate Zt' is incorporated such that the difference between projection positions of the different Z-coordinates becomes small as the elevation angle φ is brought close to 0°.

(Step D)

Each point of the three-dimensional model is projected to the xy-plane of the coordinate system of the camera A as the two-dimensional coordinate through the step C. In the step D, the height in which the pre-correction Z-coordinate Zt at the corresponding point of the three-dimensional model Mt is converted into the coordinate in units of pixels is correlated to each projected point, thereby providing the three-dimensional coordinate of the camera coordinate system to each point. The perspective transformation of the set of the three-dimensional coordinates is performed using the pieces of information set in the manipulation region 31. The specific operational equation becomes an equation (d).

[Formula 7]

$$\begin{pmatrix} x' \\ y' \end{pmatrix} = \begin{pmatrix} -\sin\theta & \cos\theta \\ \cos\theta \cdot \sin\phi & \sin\theta \cdot \sin\phi \end{pmatrix} \begin{pmatrix} x - xo \\ yo - y \end{pmatrix} + \begin{pmatrix} xo + tx \\ yo + ty - \dfrac{Zt}{K}\cos\phi \end{pmatrix} \quad (d)$$

In the equation (d), (xo, yo) is a coordinate on the screen corresponding to an origin of the camera coordinate system, tx corresponds to the lateral motion amount specified in the manipulation region 31, and ty corresponds to the longitudinal motion amount specified in the manipulation region 31.

K in the equation (d) is a scale factor of the camera coordinate system (full scale per one pixel, unit is millimeter (mm)). The scale factor K is determined as follows based on a relationship between the plane of Z=0 of the world coordinate system and the plane of x=0 of the camera coordinate system.

The coordinate (x0, y0) at the projection point of the origin (0, 0, 0) of the world coordinate system is computed by the following equation (2-1) in which the origin of the world coordinate system is substituted for the equation (2).

[Formula 8]

(In the case of (X, Y, Z) = (0, 0, 0,)) (2-1)

$$\begin{pmatrix} x_0 \\ y_0 \end{pmatrix} = \frac{1}{P_{23}} \begin{pmatrix} P_{00} & P_{01} & P_{02} & P_{03} \\ P_{10} & P_{11} & P_{12} & P_{13} \end{pmatrix} \begin{pmatrix} 0 \\ 0 \\ 0 \\ 1 \end{pmatrix} = \frac{1}{P_{23}} \begin{pmatrix} P_{03} \\ P_{13} \end{pmatrix}$$

Then the coordinate (x1, y1) at the projection point for the coordinate (1, 0, 0) and the coordinate (x2, y2) at the projection point for the coordinate (0, 1, 0) are computed from the following equations (2-2) and (2-3) in which the coordinate (1, 0, 0) corresponding to the point 1-mm away from the origin on the X-axis and the coordinate (0, 1, 0) corresponding to the point 1-mm away from the origin on the Y-axis are substituted for the equation (2), respectively.

[Formula 9]

(In the case of $(X, Y, Z) = (1, 0, 0)$)   (2-2)

$$\begin{pmatrix} x_1 \\ y_1 \end{pmatrix} = \frac{1}{P_{20}+P_{29}} \begin{pmatrix} P_{00} & P_{01} & P_{02} & P_{03} \\ P_{10} & P_{11} & P_{12} & P_{13} \end{pmatrix} \begin{pmatrix} 1 \\ 0 \\ 0 \\ 1 \end{pmatrix} = \frac{1}{P_{20}+P_{23}} \begin{pmatrix} P_{00}+P_{03} \\ P_{10}+P_{13} \end{pmatrix}$$

[Formula 10]

(In the case of $(X, Y, Z) = (0, 1, 0)$)   (2-3)

$$\begin{pmatrix} x_2 \\ y_2 \end{pmatrix} = \frac{1}{P_{21}+P_{23}} \begin{pmatrix} P_{00} & P_{01} & P_{02} & P_{03} \\ P_{10} & P_{11} & P_{12} & P_{13} \end{pmatrix} \begin{pmatrix} 0 \\ 1 \\ 0 \\ 1 \end{pmatrix} = \frac{1}{P_{21}+P_{29}} \begin{pmatrix} P_{01}+P_{03} \\ P_{11}+P_{13} \end{pmatrix}$$

Then, for the camera coordinate system, a size Kx per one pixel in the direction corresponding to the X-axis direction of the world coordinate system and a size Ky per one pixel in the direction corresponding to the Y-axis direction of the world coordinate system are computed by performing the equations (3) and (4) using the coordinate of each projection point.
It is assumed that an average value of the sizes Kx and Ky is the scale factor K.

[Formula 11]

$$Kx = \frac{1}{\sqrt{(x_0-x_1)^2 + (y_0-y_1)^2}} \quad (3)$$

$$Ky = \frac{1}{\sqrt{(x_0-x_2)^2 + (y_0-y_2)^2}} \quad (4)$$

The operation for obtaining the scale factor K can be performed after the calibration processing is ended.

In the equation (d), the coordinate in which the full-scale Z-coordinate Zt is converted into the coordinate in units of pixels by the scale factor K is set to each projection point. Accordingly, each point projected to the plane of z=0 of the coordinate system of the camera A is moved from the plane of z=0 by a distance corresponding to Zt/K, and the point is three-dimensionally disposed in the camera coordinate system to perform the perspective transformation.

Because the scale factor that is substantially equal to that of the x-coordinate or y-coordinate is set to the Z-coordinate at each projection point, a halting state is eliminated in an interval between the projection points in the height direction, and the perspective transformation can be performed to the projection point in which a balance with distribution on the xy-plane is established. The x-coordinate and y-coordinate at each projection point are adjusted according to the elevation angle φ by the equations (b) and (c). Therefore, even if the setting direction of the line of sight is largely deviated from the direction in which the imaging surface is squarely seen, the influence of the Z-coordinate on the position in which each point of the three-dimensional model Mt is projected can be reduced, and the deformation of the projection image can be prevented from being generated through the second-time perspective transformation. Accordingly, the stereoscopic image in which the shape of the three-dimensional model is expressed without a feeling of strangeness can be produced.

FIG. 8 schematically illustrates a procedure of processing performed to one workpiece.

Referring to FIG. 8, in step S1, the three-dimensional measurement is performed to the workpiece W. In step S2, the three-dimensional information restored by the measurement is checked with the three-dimensional model to recognize the position and rotation angle of the workpiece W.

In step S3, the azimuth θ and the elevation angle φ are set to an initial value of 0°, the steps A, B, C, and D of FIG. 7 are performed to the three-dimensional model M to produce the three-dimensional model graphic MG. In step S4, the produced three-dimensional model graphic MG and the processing object image G are displayed on the display unit 25 while superimposed on each other. Therefore, the image in the state of FIG. 4 is displayed on the screen of the display unit 25.

Then, until the manipulation is ended, the processing for updating the displays of the three-dimensional model graphic MG and processing object image G is performed according to the manipulation of the setting change of the parameters for the perspective transformation (steps S5, S6, and S7).

The loop in step S6 will specifically be described.

In step S6, the steps B, C, and D of FIG. 7 are performed to the post-coordinate-transformation three-dimensional model Mt, thereby producing the three-dimensional model image according to the specified azimuth θ and elevation angle φ. That is, it is only necessary to perform the step A of FIG. 7 once after the recognition processing. Since then, the pieces of processing in the steps B, C, and D are performed to the post-coordinate-transformation three-dimensional model Mt, which allows the three-dimensional model graphic MG to be produced.

As to the processing object image G, while the x- and y-coordinates of each pixel are directly applied, the z-coordinate of 0 is set to all the pixels to perform the computation similar to the equation (d). The display in the image display region 30 is updated by the display in which the three-dimensional model graphic MG is superimposed on the post-transformation processing object image G.

In the procedure, after the user confirms the result and accuracy of the recognition by seeing the display of the processing object image G of the usual attitude and the three-dimensional model graphic MG matched with the processing object image G, the user can freely change the azimuth θ and the elevation angle φ to confirm the relationship between the three-dimensional model and the workpiece W in the processing object image from various directions.

The image display of the embodiment is performed for the camera A. However, for the cameras B and C, the image produced each of the cameras is correlated to the three-dimensional model image by the similar technique, and the image obtained by perspective transformation processing can be displayed from various directions. In the embodiment, at the beginning of the production of the three-dimensional model graphic MG, the coordinate transformation of the three-dimensional model image is performed based on the recognition result. When the result of the coordinate transformation performed through the recognition processing in step S2 is stored, because of the use of the storage data, it is unnecessary to perform the coordinate transformation again.

In the embodiment, the three-dimensional information on the workpiece W is restored by the stereo measurement using the plural cameras. The three-dimensional measurement method is not limited to the stereo measurement, but a method for processing the image produced by one camera can also be adopted. For example, a surface of the workpiece W may be illuminated with spot light to determine the three-dimensional coordinate at an illumination point of the spot light from a coordinate at a bright point in the image. Alternatively, the height of the workpiece model is changed in various ways, the imaging is performed to produce plural two-dimensional models, the image of the workpiece W of the processing object is sequentially checked with each of the two-dimensional models to specify the height and rotation angle of the workpiece W, and the specification result is reflected in each feature point of the image to derive the plural three-dimensional coordinates. In any method, when the restored three-dimensional information is checked with the full-scale three-dimensional model to recognize the position and attitude of the workpiece W, the recognition result can be displayed by the technique similar to that of the embodiment.

What is claimed is:

1. A method for displaying recognition result of a three-dimensional visual sensor, the three-dimensional visual sensor including: an imaging unit that includes at least one camera; a registration unit in which three-dimensional information expressing a full-scale recognition-target object is registered as a three-dimensional model; and a recognition unit that performs three-dimensional measurement to a recognition-target object whose three-dimensional model is registered in the registration unit using an image produced by imaging of the imaging unit and checks three-dimensional information restored by the measurement with the registered three-dimensional model to recognize a position and an attitude of the recognition-target object, on condition that a world coordinate system is defined such that a distance from a reference plane traversing a direction of an optical axis of the camera in the imaging unit becomes a Z-coordinate indicating a height, wherein at least one of the cameras is set to a processing object, a first step, a second step, a third step, and a fourth step are performed every camera of the processing object, in the first step, a manipulation of specification of a direction of a line of sight with respect to an imaging surface of the camera being received, in the second step, a plurality of Z-coordinates included in a three-dimensional model being corrected to perform perspective transformation of a post-correction three-dimensional model into a coordinate system of the imaging surface of the camera of the processing object for the three-dimensional model to which coordinate transformation is performed in a world coordinate system such that the position and attitude of the three-dimensional model become identical to those of the recognition-target object recognized by the recognition unit, in the third step, perspective transformation of a point having a three-dimensional coordinate value obtained by setting a height according to a corresponding pre-correction Z-coordinate into a point having a three-dimensional coordinate value obtained by setting a point included in an projection image of the three-dimensional model produced in the coordinate system of the imaging surface of the camera of the processing object by the perspective transformation processing being performed from the direction of the line of sight received in the first step, in the fourth step, the projection image produced by the perspective transformation in the third step being displayed on a monitor device, and a rule of correction operation is applied to the Z-coordinate correction in the second step, in the rule of correction operation, a correction amount to each Z-coordinate being set to zero when an orthogonal relationship is established between the direction of the line of sight received in the first step and the imaging surface of the camera of the processing object, each Z-coordinate being corrected to a constant value Z0 when the direction of the line of sight becomes parallel to the imaging surface, each post-correction Z-coordinate being brought close to the constant value Z0 as the relationship between the direction of the line of sight and the imaging surface becomes close to a parallel state from the orthogonal state, a difference between post-correction Z-coordinates Z1' and Z2' of any two of Z-coordinates Z1 and Z2 (Z1>Z2) being gradually decreased while a relationship of Z1'>Z2' is maintained.

2. The method according to claim 1, wherein a step of specifying a size per one pixel is previously performed to the camera of the processing object based on a relationship between the coordinate system of the camera and the world coordinate system, the size per one pixel being allocated to the imaging surface in performing perspective transformation of a plane in which a height in a space is zero into the imaging surface of the camera of the processing object, and in the third step, for each point of the projection image of the three-dimensional model, the pre-correction Z-coordinate at a corresponding point of the pre-coordinate-transformation three-dimensional model is converted into the number of pixels based on the size per one pixel specified in the step, and the number of pixels is set to the height after the conversion.

3. A three-dimensional visual sensor comprising:

an imaging unit that includes at least one camera;

a registration unit in which three-dimensional information expressing a full-scale recognition-target object is registered as a three-dimensional model;

a recognition unit that performs three-dimensional measurement to a recognition-target object whose three-dimensional model is registered in the registration unit using an image produced by imaging of the imaging unit and checks three-dimensional information restored by the measurement with the registered three-dimensional model to recognize a position and an attitude of the recognition-target object, on condition that a world coordinate system is defined such that a distance from a reference plane traversing a direction of an optical axis of the camera in the imaging unit becomes a Z-coordinate indicating a height;

a specifying manipulation receiving unit that sets at least one of the cameras to a processing object to receive a manipulation of specification of a direction of a line of sight with respect to an imaging surface of the camera of the processing object;

a first perspective transformation unit that corrects a plurality of Z-coordinates included in a three-dimensional model to perform perspective transformation of a post-correction three-dimensional model into a coordinate system of the imaging surface of the camera of the processing object based on a relationship between the direction of the line of sight received by the specifying manipulation receiving unit and the imaging surface of the camera of the processing object, the three-dimensional model to which coordinate transformation is performed in a world coordinate system such that the position and attitude of the three-dimensional model become identical to those of the recognition-target object recognized by the recognition unit;

a second perspective transformation unit that performs perspective transformation of a point having a three-dimensional coordinate value obtained by setting a height according to a corresponding pre-correction Z-coordinate into a point having a three-dimensional coordinate value obtained by setting a point included in an projection image of the three-dimensional model produced in the coordinate system of the imaging surface of the camera of the processing object by the perspective transformation processing performed through the first perspective transformation unit from the direction of the line of sight received in the specifying manipulation receiving unit; and a display control unit that displays the projection image produced through the perspective transformation performed by the second perspective transformation unit on a monitor device, wherein a rule of correction operation is applied to the Z-coordinate correction in the first perspective transformation unit, in the rule of correction operation, a correction amount to each Z-coordinate being set to zero when an orthogonal relationship is established between the direction of the line of sight received in the first step and the imaging surface of the camera of the processing object, each Z-coordinate being corrected to a constant value Z0 when the direction of the line of sight becomes parallel to the imaging surface, each post-correction Z-coordinate being brought close to the constant value Z0 as the relationship between the direction of the line of sight and the imaging surface becomes close to a parallel state from the orthogonal state, a difference between post-correction Z-coordinates Z1' and Z2' of any two of Z-coordinates Z1 and Z2 (Z1>Z2) being gradually decreased while a relationship of Z1'>Z2' is maintained.

\* \* \* \* \*